Nov. 14, 1939.   A. D. KEENE   2,179,936
AUTOMATIC CONTROL FOR COOKING UTENSILS
Filed Nov. 26, 1934
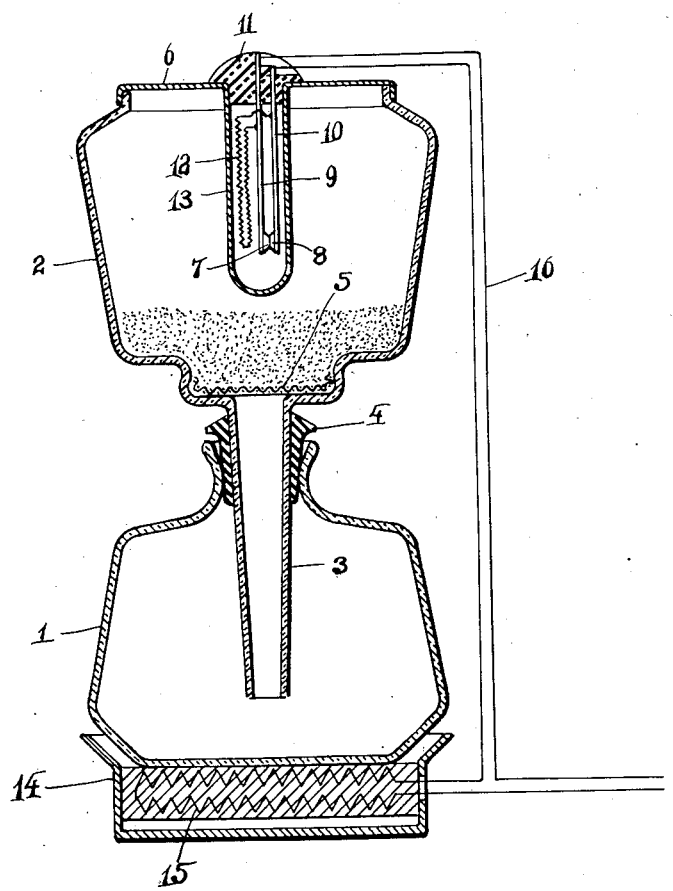
INVENTOR
ALVIN D. KEENE
BY
ATTORNEY Patented Nov. 14, 1939

2,179,936

UNITED STATES PATENT OFFICE 2,179,936

AUTOMATIC CONTROL FOR COOKING UTENSILS

Alvin D. Keene, Rochester, N. Y., assignor to Samson-United Corporation, Rochester, N. Y.

Application November 26, 1934, Serial No. 754,723

9 Claims. (Cl. 219—43)

This invention relates to coffee makers, cookers and liquid heaters and has for one of its objects to make such devices entirely automatic in their operation so as to eliminate the necessity for close supervision thereof during their operation.

Another object of this invention is to prevent a coffee maker or other cooking utensil from boiling over.

A further object of this invention is to prevent the bottom vessel of a vacuum type of coffee maker from boiling dry and causing the vessel to break and spill the liquid in the top vessel supported thereby.

Another object of this invention is to prevent a coffee maker or other cooking utensil from cooking too long a period.

All these and other objects of this invention will become more readily apparent from the detailed description thereof which follows, reference being had to the accompanying drawing in which the figure shows a vertical sectional view of a vacuum coffee maker, its heater and the automatic control diagrammatically illustrated in conjunction therewith.

For illustrating purposes I have shown and described my invention in combination with a vacuum type of coffee maker but it is understood that I do not wish to limit myself to the use of my invention in combination with this type of coffee maker but consider that my invention may be used with many other types of cooking utensils and liquid heaters as fairly come within the scope of the appended claims.

The vacuum type of coffee maker illustrated in the figure of the drawing comprises the bottom vessel 1 having a top vessel 2 supported thereon. These vessels are connected by a tube 3 which depends from the bottom of the upper vessel and extends thru the neck of the bottom vessel to within a short distance of the bottom thereof. A sealing member 4 surrounds the tube 3 at the point where it passes thru the neck of the bottom vessel and seals the bottom vessel except for the passage provided by the tube 3 between the bottom and top vessel.

A filter 5 is located in the bottom of the upper vessel at the entrance into the tube 3 so that all liquid passing to and from the upper vessel thru the tube 3 is filtered thereby. The coffee maker is prepared for the making of coffee by filling the bottom vessel with the proper amount of water and then sealing the bottom vessel with the top vessel. The ground or pulverized coffee beans from which the coffee is to be brewed is placed into the top vessel over the filter 5. The bottom vessel with the top vessel supported thereon and connected therewith is then placed on a heater so as to heat the water therein to the boiling point and create a pressure in the bottom vessel which will force the water from the bottom vessel thru the tube 3 and the filter 5 into the top vessel to brew the coffee from the ground or pulverized coffee beans contained therein.

The heater is then shut off or the coffee maker removed from it to allow the bottom vessel to cool and have the residuary steam therein condense and create a partial vacuum as a result of it. Atmospheric pressure will then force the liquid coffee which has been brewed in the top vessel by its contact with the ground coffee beans, thru the filter 5 and tube 3 back into the bottom vessel from which it can be dispensed after the removal of the top vessel therefrom.

While the operation of the vacuum type of coffee maker, as above described, should theoretically produce perfect coffee without any trouble, it has been found that this is not the case. In the first place the water, which is forced from the bottom vessel to the top vessel, is cooled in entering the top vessel so that if it is not brought back to the proper temperature in which it will efficiently brew coffee during its contact with the ground or pulverized coffee beans, the resultant coffee will be weak or it will take a considerably larger quantity of the ground or pulverized coffee beans to brew a desired strength coffee. It also happens that if less than the full capacity of coffee is brewed so that the lower vessel is only partially filled with water, some cool water is forced into the top vessel due to the expansion of the air in the empty portion of the lower vessel, before the water in the lower vessel is brought to a boiling point therein and the water is forced into the top vessel by steam pressure.

If steam is allowed to flow up thru the tube and thru the water in the upper vessel in order to compensate for the heat lost in the liquid during its transfer or forced up cold due to the expansion of the air in the lower vessel, several undesirable features may develop in the operation of this type of coffee maker unless its operation is closely supervised.

The first of these undesirable features develops when steam produced in the lower vessel is forced thru the liquid in the top vessel and spatters some of the liquid out of the top vessel over the table on which the coffee maker is supported. Another and more serious trouble arises when the lower vessel is allowed to completely boil dry and the heater keeps on heating the dry glass of the lower vessel until it cracks and breaks as the result of it and thus removes its support from the top vessel so that the latter falls and spills its entire contents. Further trouble arises when the liquid in the top vessel is allowed to boil too long a period with the result that a bitter coffee is brewed therein.

These drawbacks are inherent to all vacuum type coffee makers now on the market and have prevented the brewing of uniform coffee in this type of coffee maker especially when operated by persons not familiar with the proper operation of such a coffee maker.

These drawbacks have been eliminated and the operation of a vacuum type coffee maker has been made entirely automatic by the use of my present invention which consists of the thermostatic control which is held suspended in the top vessel 2 of the coffee maker and is connected with the heater of the coffee maker so as to control the operation thereof.

For the purpose of illustration the thermostatic control is shown suspended from a cover 6 which closes the open top of the vessel 2. However I do not wish to limit myself to this type of support as the thermostatic control may be held suspended in the top vessel in any other suitable manner without departing from the spirit of this invention.

The thermostatic control comprises a pair of contact members 7 and 8 which are normally held in contact with each other by their supporting members 9 and 10, one or both of which are made up of a bi-metallic or other suitable thermoresponsive element. The mounting of the two supporting members is provided by a suitably insulated base 11 which keeps them electrically insulated from each other and the outside support, the cover 6 in this instance. Suitably mounted and located in close proximity to the supporting members 9 and 10, especially the thermoresponsive member thereof, is a small capacity electric heating unit 12 of approximately seven watt capacity in this case. This heating unit is electrically connected to the supporting members 9 and 10 so as to be electrically connected in parallel with the contacts 7 and 8 thereof. As long as electric current is allowed to pass from one contact support to the other thru the contacts 7 and 8, no current will therefore flow thru the high resistance path provided by the heating unit 12 which keeps this heating unit normally inactive.

To complete the thermostatic control, the contacts 1 and 8, their supporting members 9 and 10, together with their heating unit 12 are surrounded by a suitable moisture proof casing 13 which permits the control to be suspended in the liquid during the brewing of the coffee. By increasing or decreasing the thickness of the material from which this housing is made or increasing and decreasing the diameter of the housing 13, the time period for the transmission of heat from the liquid to the thermoresponsive element may be changed so as to cause the thermostatic control to operate at the proper time as will hereinafter appear.

When the coffee maker is operated by an electric heater 14, as illustrated in the figure of the drawing, the heating unit 15 thereof is electrically connected in series with the contact 7 and 8 by the electric circuit 16 diagrammatically illustrated in conjunction therewith. The contacts 7 and 8 thus form a control switch for the current which operates the electric heating unit 15. The coffee maker is suitably supported over the electric heating unit so that its operation will gradually heat the liquid in the bottom vessel 1 and force it into the top vessel on the boiling thereof as above described.

The thermostatic control is thus brought in contact with the liquid forced into the top vessel and is heated thereby so that the heat of the liquid is transmitted to the supporting members which support the contact members 7 and 8. As previously pointed out, one or both of the supporting members are thermoresponsive and these members are so arranged that at a predetermined temperature the two supporting members flex away from each other and separate the contacts 7 and 8. The thermoresponsive supporting member or members are adjusted so that this predetermined temperature corresponds to the proper temperature of the liquid in the top vessel at which the coffee is to be brewed so that just as soon as this temperature has been reached, the electric current for the operation of the heating unit 15 is reduced to a point where the heater 14 will gradually cool off. In this way the thermostatic control will prevent the operation of the heater from causing a further rise in temperature. The liquid in the top vessel is brought to the desired temperature by heat supplied from the steam forced into the top vessel on the boiling of the residual water in the bottom vessel. The temperature of the liquid is thus raised in the top vessel to compensate for the loss of heat during its transfer from the bottom vessel and when this has been effected, the thermostatic control operates to prevent a further heating or boiling of the liquid in the top vessel by greatly reducing the current passing through the heater 14.

Just as soon as the contacts 7 and 8 are separated by the action of the thermostatic control, the small capacity heating unit 12 is cut in and connected in series with the heating unit 15 of the electric heater in place of the contacts 7 and 8. A small amount of current is thus allowed to flow thru the electric heater 15 which, however, is not sufficient to materially heat the heating unit 15 but heats the smaller electric heating unit 12 and generates enough heat within the housing 13 to keep the thermoresponsive member of the thermostatic control in its operated position into which it was placed by the heat transmitted from the liquid in the top vessel. The withdrawal of the liquid from the top vessel back into the bottom vessel in the final operation of the coffee maker after the current through heater 15 has been greatly reduced, will therefore not affect the thermostatic control so that the contacts 7 and 8 will remain separated and prevent a second full-load operation of the heating unit 15.

The operation of the thermostatic control thus allows the liquid in the upper vessel to be brought to the proper temperature by keeping the heater of the coffee maker in operation until the liquid has been heated to that point. The thermostatic control then greatly reduces the current through the heater 15 to allow the bottom vessel to cool for the transfer of the brewed coffee from the top to the bottom vessel and maintains the current through the heater 15 and the heat generated thereby at a low value so that it will not reheat the brewed coffee and force it back into the top vessel for a second brewing.

When the vacuum coffee maker is operated by a gas, oil or other non-electric heater, the thermostatic control may be made to shut off the fuel supply for such a heater after the liquid has been brought to the proper temperature for the brewing of the coffee.

A hand reset latch mechanism may be used in place of the auxiliary heating unit 12 in order to keep the electric circuit between contacts 7 and 8 open until they are allowed to move together on the manual release of a suitable reset latch.

From the foregoing it will be apparent that the thermostatic control is operated only by the heat of the liquid forced into the top vessel and that it shuts off the heater of the coffee maker only after the liquid in the top vessel has reached a predetermined temperature for the brewing of the coffee. In this way the thermostatic control corrects any cooling off of the water in the top vessel due to its transfer from the bottom vessel or provides for the heating of the cold water which rises into the top vessel when less than the full capacity of the coffee maker is being brewed. It thus makes this type of coffee maker fully automatic, does away with necessity of close supervision of the coffee maker during its operation, especially the final stages thereof and prevents the boiling over of the liquid in the top vessel and the boiling dry of the lower vessel. It stops the brew before the coffee becomes bitter and thus operates to control the coffee maker to brew a perfect and uniform coffee at each operation.

I claim:

1. In combination with a cooking utensil comprising an upper vessel and a lower vessel connected by a duct for the transfer of liquid from one vessel to the other vessel and a heater for heating the liquid in the lower vessel of said cooking utensil and forcing it through said duct into the upper vessel, of a thermoresponsive member located so as to be affected by the heat of the liquid in the upper vessel of said utensil, means operated by said thermoresponsive element for controlling said heater and electric heating means cooperating with said thermoresponsive member to hold said thermoresponsive element in an operated position on the withdrawal of the liquid therefrom.

2. In combination with a cooking utensil comprising an upper vessel and a lower vessel connected by a duct for the transfer of liquid from one vessel to the other vessel and a heater for heating the liquid in the lower vessel and forcing it into the upper vessel of said cooking utensil, of a thermoresponsive member located so as to be affected by the heat of the liquid in the upper vessel of said utensil, means operated by said thermoresponsive element for controlling said heater and electric heating means cooperating with said thermoresponsive member to hold said thermoresponsive element in an operated position on the withdrawal of the liquid therefrom.

3. In combination with a vacuum type of coffee maker having a bottom and a top vessel connected by a duct of reduced diameter, and a heater for heating said bottom vessel, of a thermostatic control mounted to be operated by the temperature of the liquid in the top vessel, auxiliary heating means associated with said thermostatic control for holding said thermostatic control in its operated position after the withdrawal of the liquid from the top into the bottom vessel and means operated by said thermostatic control for controlling said heater in heating the bottom vessel.

4. In combination with a vacuum type of coffee maker having a bottom vessel and a top vessel connected by a duct and an electric heater for heating said bottom vessel, and forcing it contents through the duct into the top vessel, a thermostatic control including a thermoresponsive member carried by the top vessel, an electric heating unit associated with said thermostatic control to additionally heat the liquid contents of said top vessel, and means operated by said thermoresponsive member to cause the heating of said electric heating unit to reduce the operation of said heater to cause cooling of the bottom vessel.

5. In an electric cooking utensil, a lower vessel provided with heating means, an upper vessel separably mounted on said lower vessel and having a passage connecting therewith, a thermostatic control unit positioned in said upper vessel in heat exchange relation with said upper vessel and its contents, means actuatable by said control unit for actuating said heating means, and a heating element cooperating with said thermostatic control unit to maintain said thermostatic control unit in its heat actuated position after said thermostatic control unit has been actuated by the heat of the contents of said upper vessel.

6. In an electric cooking utensil, a lower vessel comprising a primary electric heating element, an upper vessel separably mounted on said lower vessel and having a passage communicating therewith, a control unit positioned in said upper vessel and comprising a thermostatic switch and an auxiliary electrical heating element in heat exchange relation with said switch, the contacts of said thermostatic switch being connected in shunt with said secondary heating element and in series with said primary heating element.

7. In a electric cooking utensil, a lower vessel comprising a primary electric heating element, an upper vessel separately mounted on said lower vessel and having a passage communicating therewith, a control unit positioned in said upper vessel and comprising a thermostatic switch and an auxiliary electrical heating element in heat exchange relation with said switch, and means connecting said switch to said heating elements for energizing said auxiliary heating element and for partially deenergizing said primary heating element when said switch is actuated.

8. In an electric cooking utensil, a lower vessel comprising a primary electric heating element of relatively large heat capacity, an upper vessel separably mounted on said lower vessel and having a passage communicating therewith, a control unit positioned in said upper vessel and comprising a thermostatic switch and an auxiliary electrical heating element of relatively small heat capacity, in heat exchange relation with said switch, the contacts of said thermostatic switch being connected in shunt with said secondary heating element and in series with said primary heating element.

9. In an electric cooking utensil, a lower vessel comprising a primary electric heating element of relatively small electrical resistance, an upper vessel separably mounted on said lower and having a passage communicating therewith, a control unit positioned in said upper vessel and comprising a thermostatic switch and an auxiliary electrical heating element of relatively large electrical resistance, in heat exchange relation with said switch, the contacts of said thermostatic switch being connected in shunt with said secondary heating element and in series with said primary heating element.

ALVIN D. KEENE.